United States Patent
Sun

(10) Patent No.: US 11,512,764 B2
(45) Date of Patent: Nov. 29, 2022

(54) TOOL CHANGING SYSTEM WITH RIGIDITY IMPROVED BELT MOVING MECHANISM

(71) Applicant: Chen Sound Industrial Co., Ltd., Taichung (TW)

(72) Inventor: Ying Sun, Taichung (TW)

(73) Assignee: CHEN SOUND INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/739,532

(22) Filed: Jan. 10, 2020

(65) Prior Publication Data
US 2021/0062896 A1    Mar. 4, 2021

(30) Foreign Application Priority Data

Aug. 28, 2019  (TW) ................................ 108130783

(51) Int. Cl.
*F16H 19/06*    (2006.01)
*F16M 11/42*    (2006.01)
(Continued)

(52) U.S. Cl.
CPC ....... *F16H 19/0645* (2013.01); *B23Q 3/1554* (2013.01); *F16M 11/2085* (2013.01); *F16M 11/425* (2013.01); *F16H 2019/0668* (2013.01)

(58) Field of Classification Search
CPC ......... F16H 19/0645; F16H 2019/0668; F16H 19/06; F16H 19/0613; B23Q 3/1554; B23Q 5/22; B23Q 3/15536; F16M 11/2085; F16M 11/425; F16M 11/18; F16M 11/043; F16G 1/28
See application file for complete search history.

(56) References Cited

U.S. PATENT DOCUMENTS

| | | | | |
|---|---|---|---|---|
| 5,901,607 A * | 5/1999 | Kimura | ................... | F16H 19/06 74/89.21 |
| 2009/0301237 A1* | 12/2009 | Everman | ................. | F16H 19/06 74/37 |

FOREIGN PATENT DOCUMENTS

| | | | |
|---|---|---|---|
| CN | 103358140 A | * | 10/2013 |
| CN | 108857524 A | * | 11/2018 |

(Continued)

OTHER PUBLICATIONS

Interroll conveyor roller, roller drive, drive control catalog, publication date Feb. 2016 (Year: 2016).*

(Continued)

*Primary Examiner* — Terrell L McKinnon
*Assistant Examiner* — Ding Y Tan
(74) *Attorney, Agent, or Firm* — Muncy, Geissler, Olds & Lowe, P.C.

(57) ABSTRACT

A tool changing system with rigidity improved belt moving mechanism includes a pedestal, a sliding base, a driving unit, a positioning belt, and a transmission belt. The sliding base is disposed on the pedestal, and reciprocatively moves along a linear direction. The driving unit is disposed on the sliding base. The positioning belt and the transmission belt are disposed on the pedestal and include a gear rack, respectively. A detouring section of the transmission belt is separated from the positioning belt, and transmissibly meshed with the driving wheel of the driving unit. When the driving wheel rotates, the detouring section is driven to continuously shift on the transmission belt, and the sliding base is simultaneously driven to slide on the pedestal along the linear direction. Thus, a combination of the positioning belt and the transmission belt achieves an improved rigidity.

8 Claims, 10 Drawing Sheets

(51) Int. Cl.
    *B23Q 3/155*         (2006.01)
    *F16M 11/20*       (2006.01)

(56) References Cited

FOREIGN PATENT DOCUMENTS

| EP | 0160923 A1 | * | 11/1985 |
| JP | 0708273 A2 | * | 4/1996 |
| KR | 20130030928 A | * | 3/2013 |
| KR | 20160069288 | * | 6/2016 |
| KR | 101707206 B1 | * | 2/2017 |

OTHER PUBLICATIONS

Raimund Perneder & Ian Osborne "Handbook Timing Belts: Principles, Calculations, Applications" published by Springer, 2012, 276 pages (Year: 2012).*
Andreas Ebhart article "Why do timing belts need guidance?"—Habasit Expert Blog—dated: Jan. 31, 2019 (Year: 2019).*
HabaSYNC® Timing Belts Engineering Guide—Habasit AG, services media No. 6018 (updated Mar. 2013) (Year: 2013).*
Elatech Polyurethane drive calculation catalogue, dated Nov. 2017, https://elatech.com/wp-content/uploads/polyurethane-drive-calculation-catalogue-elatech.pdf (Year: 2017).*
Danielle Collins "Linear actuators: belt driven vs. rack and pinion driven" Linear Motion Tips online article dated Jan. 19, 2017, weblink: https://www.linearmotiontips.com/linear-actuators-belt-driven-vs-rack-and-pinion-driven/ (Year: 2017).*
Matrix Tool Magazine MAM-C40-306 YouTube video dated Feb. 10, 2014, weblink: https://www.youtube.com/watch?v=kzPfN2zgciM (Year: 2014).*

* cited by examiner

TOOL CHANGING SYSTEM WITH RIGIDITY IMPROVED BELT MOVING MECHANISM

BACKGROUND OF THE INVENTION

1. Field of the Invention

The present invention relates to transmission mechanisms of mechanical equipment, and more particularly, to a tool changing system with rigidity improved belt moving mechanism with improved rigidity.

2. Description of the Related Art

Current mechanical equipment, such as a working table with a working machine driving a workpiece to move thereon or a tool-picking transmission mechanism for a tool changing device, usually requires the ability of carrying out linear movements along a single or multiple axial directions, wherein a sliding base is necessary for the mechanical equipment. A conventional sliding base is preferably driven by a transmission means using a servomotor and a corresponding lead threaded rod. Though a high transmission accuracy is achieved, the cost of components is relatively high.

In order to reduce the cost of the sliding base driving mechanism, some sliding bases are driven by the transmission means using a gear rack and a corresponding gear, and some sliding bases are driven by the transmission means using a belt and a corresponding pulley. Therein, the transmission means using a gear rack and a corresponding gear has a higher rigidity, but the cost thereof is relatively higher than the cost of transmission means using a belt and a corresponding pulley. On the other hand, the transmission means using a belt and a corresponding pulley has an advantage of a relatively lower cost. Nevertheless, the belt is flexible, by which an insufficient rigidity is possibly caused during transmission. Especially when a longer belt is needed for meeting a relatively longer transmission distance demand, the belt is easily bent due to a lack of tension, such that issue of insufficient rigidity becomes more obvious, resulting a suboptimal transmission accuracy of the sliding base.

Thus, the objective of the present invention is to improve the abovementioned transmission issues of the sliding base, especially the apparent issues of insufficient rigidity caused by the usage of belt.

SUMMARY OF THE INVENTION

For improving the abovementioned issues, a tool changing system with rigidity improved belt moving mechanism is provided. Therein, regarding the belt moving mechanism, a sliding base is driven to move by two belts and a corresponding driving wheel. The two belts are meshed with each other by teeth, and one of the belts is fixed to provide a rigidity to the other for stabilizing the transmission.

In accordance with one embodiment of the present invention, a tool changing system with rigidity improved belt moving mechanism is provided, comprising a pedestal, a sliding base, a driving unit, a positioning belt, and a transmission belt. Therein, the sliding base is disposed on the pedestal, and reciprocates along a linear direction. The driving unit is disposed on the sliding base, and comprises a driving wheel which is driven to rotate. Two ends of the positioning belt are fixed on the pedestal and extend along the linear direction. The positioning belt comprises a first gear rack disposed between two ends of the positioning belt. Two sides of the transmission belt are fixed to the pedestal, attached to and extending with the positioning bel. The transmission belt comprises a second gear rack disposed between two ends of the transmission belt. The transmission belt is meshed with the first gear rack through the second gear rack, and comprises a detouring section which is separated from the positioning belt and transmissibly meshed with the driving wheel. The driving wheel rotates for driving the detouring section to continuously shift on the transmission belt, so as to simultaneously drive the sliding base to slide along the linear direction on the pedestal.

Thus, both the positioning belt and the transmission belt both extend along the linear direction, and are attached with each other by the meshing status of the first gear rack and the second gear rack. When the driving wheel rotates for driving the detouring section to continuously shift, except the detouring section, other sections of the transmission belt are meshed with the positioning belt by the first gear rack and the second gear rack, such that neither the positioning belt nor the transmission belt has the issue of deformation. Therefore, the positioning belt and the transmission belt have an optimal rigidity during transmission, so as to stably drive the sliding base to slide along the linear direction, thereby achieving an optimal transmission accuracy of the sliding base during the belt transmission.

DETAILED DESCRIPTION OF THE INVENTION

Figure 1:
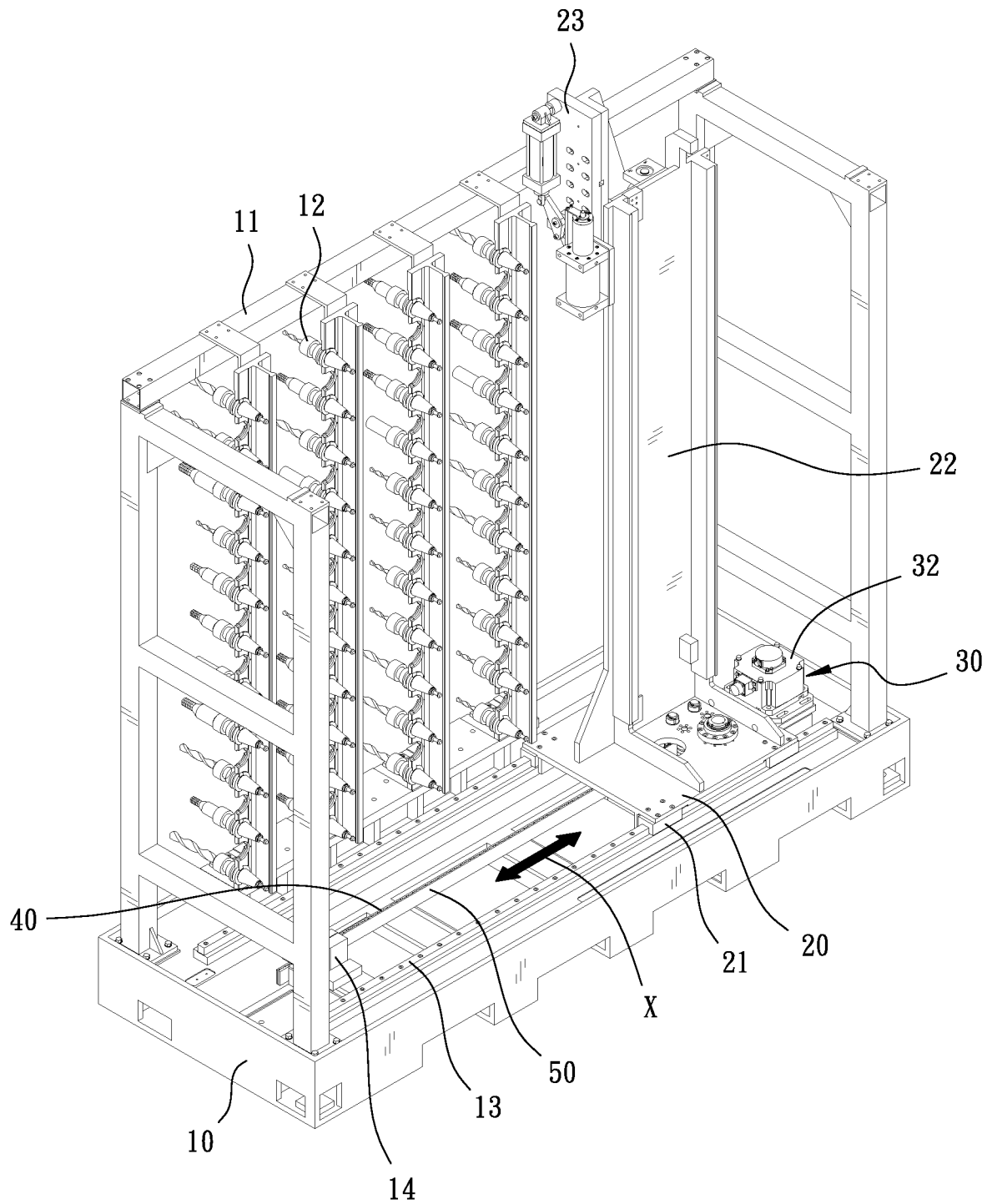
FIG. 1 is a perspective view of a belt moving mechanism in accordance with a first embodiment of the present invention, which is applied to a tool changing device.
Figure 2:
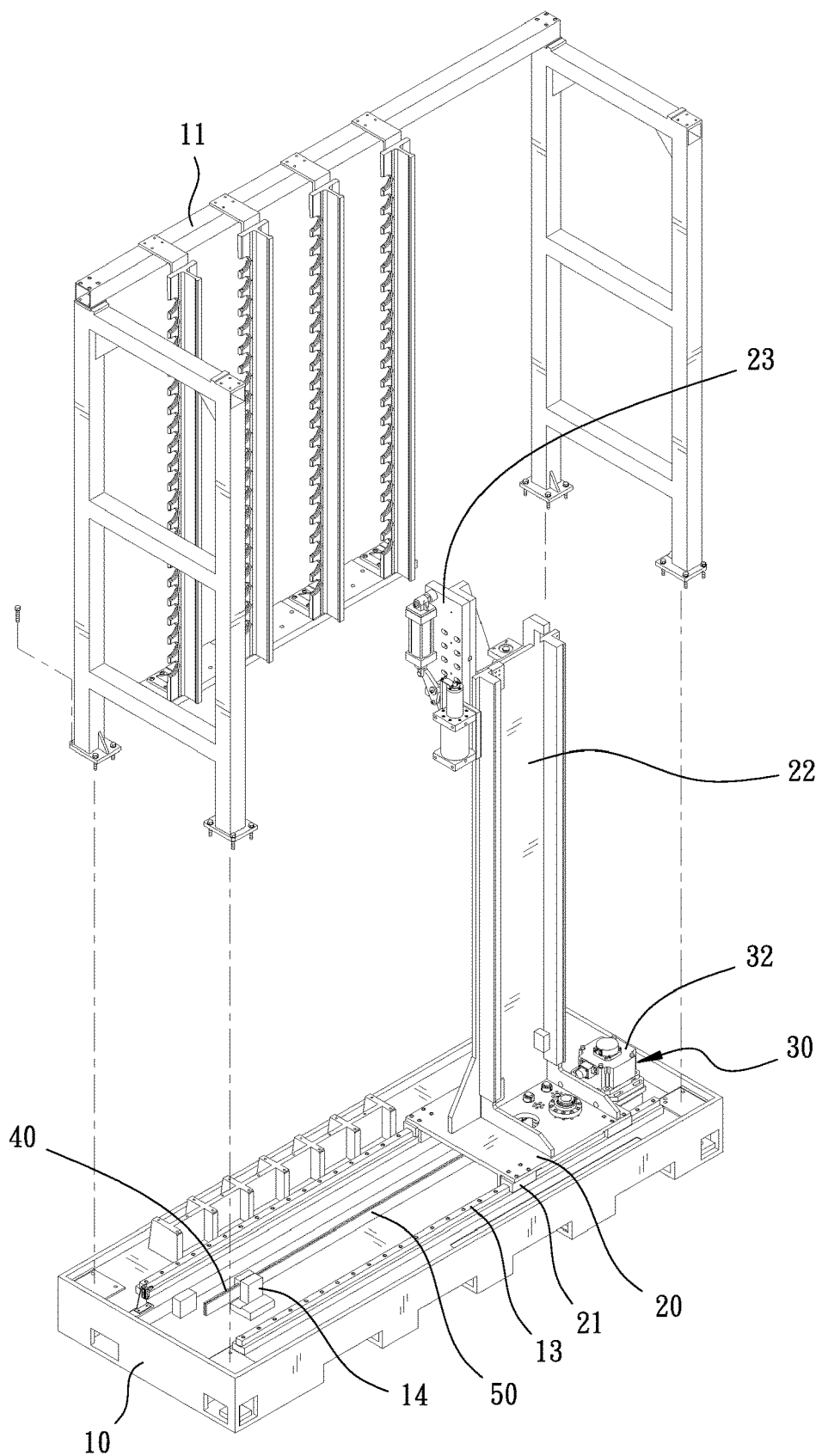
FIG. 2 is an exploded view of the arrangement shown in FIG. 1, illustrating a matrix type tool rests and a pedestal.
Figure 3:
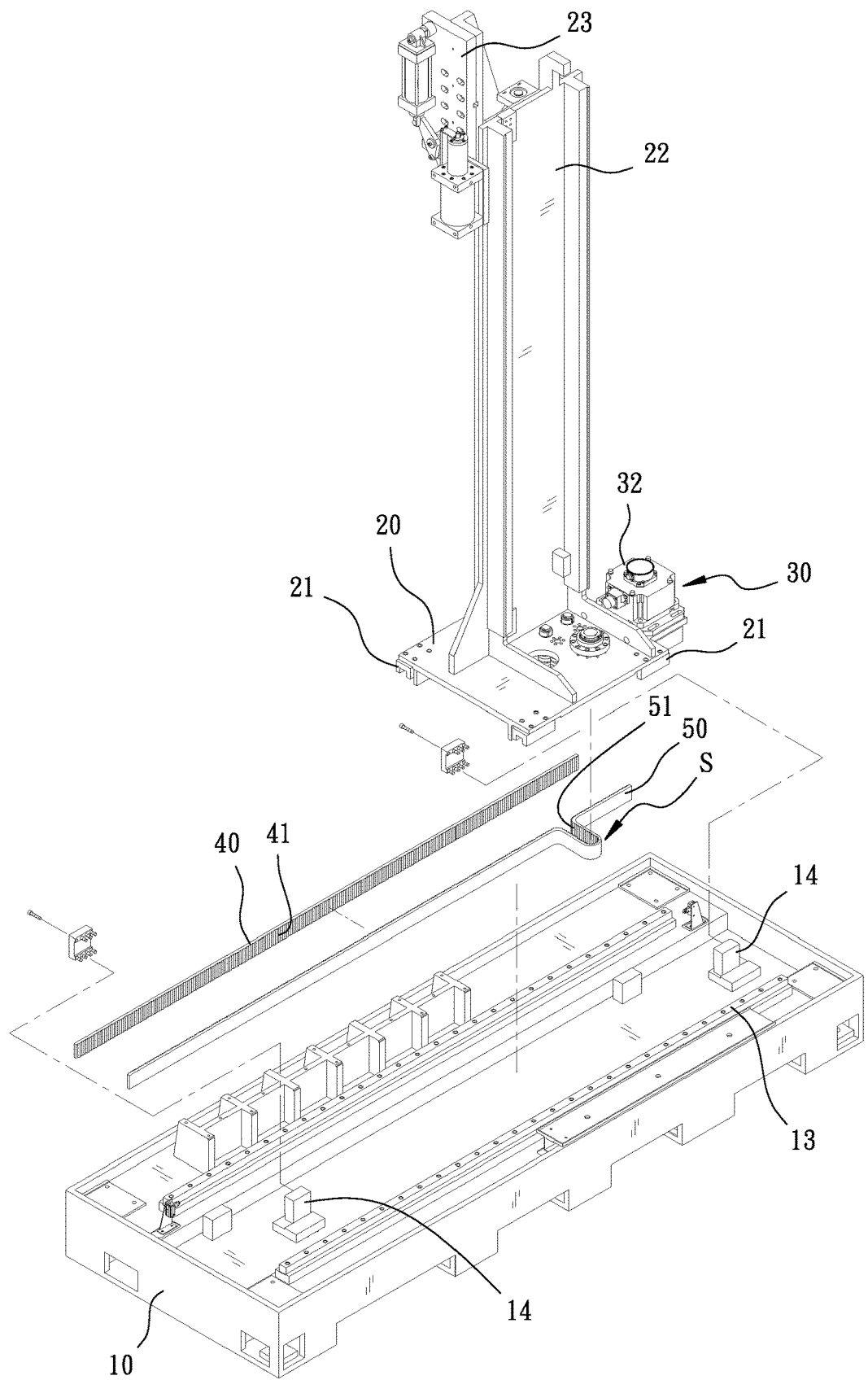
FIG. 3 is a schematic view illustrating the arrangement of the pedestal in accordance with the first embodiment of the present invention, in which an erecting frame is disposed on a sliding base.
Figure 4:
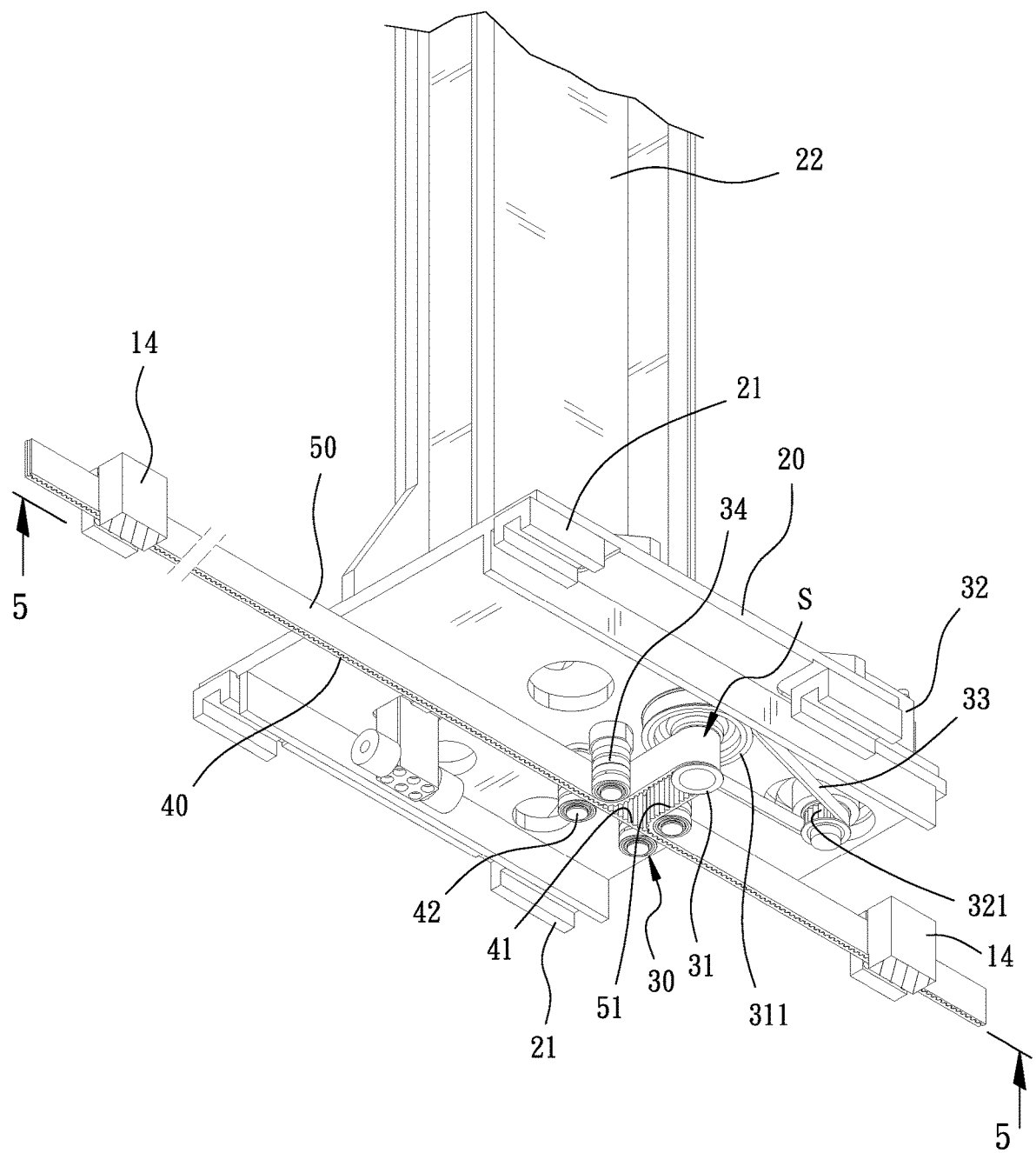
FIG. 4 is a perspective view illustrates the arrangement of a driving unit, a positioning belt, and a transmission belt in accordance with the first embodiment of the present invention, wherein a support member is two back rollers.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 10, the present invention provides a tool changing system with rigidity improved belt moving mechanism in accordance with the present invention, wherein the belt moving mechanism comprises a pedestal 10, a sliding base 20, a driving unit 30, a positioning belt 40, and a transmission belt 50. The following descriptions disclose a first embodiment of the present invention, in which a tool-picking transmission mechanism for a tool changing device is used as an explanatory application.

The sliding base 20 is disposed on the pedestal 10, and reciprocates along a linear direction X. In the first embodiment, the pedestal 10 comprises a matrix type tool rests 11 on which a plurality of tools 12 are positioned for the working machine. The pedestal 10 comprises a pair of linear rails 13, with the bottom face of the sliding base 20 slidably disposed on the two linear rails 13 through a respective sliding block 21. The sliding base 20 comprises an erecting frame 22, on which a tool changing device 23 is disposed. The sliding base 20 reciprocatively slides on the pedestal 10 along the linear direction X, and the tool changing device 23 vertically moves on the erecting frame 22, such that the tool changing device 23 is able to pick and place a tool 12 at a corresponding tool rest.

The driving unit 30 is disposed on the sliding base 20 and slides on the pedestal 10 together with the sliding base 20. The driving unit 30 comprises a driving wheel 31 which is driven to rotate.

In the first embodiment, the length of the positioning belt 40 extends to two ends of the pedestal 10. Two ends of the positioning belt 40 are fixed to the pedestal 10 and arranged between the two linear rails 13, with the positioning belt 40 extending along the linear direction X. The positioning belt 40 comprises a first gear rack 41 vertically disposed between two ends of the positioning belt 40 and facing one of the linear rails 13.

In the first embodiment, the transmission belt 50 and the positioning belt 40 are two independent belts. A length of the transmission belt 50 is approximately equal to a length of the positioning belt 40. Two ends of the transmission belt 50 are also fixed to the pedestal 10 and arranged between the two linear rails 13, with the transmission belt 50 being attached to and extending with the positioning belt 40. The transmission belt 50 comprises a second gear rack 51 vertically disposed between two ends of the transmission belt 50 and facing the other linear rail 13. When the transmission belt 50 is attached to the positioning belt 40, the second gear rack 51 is correspondingly meshed with the first gear rack 41, and a detouring section S of the transmission belt 50 detours to be separated from the positioning belt 40. The detouring section S is transmissibly meshed with the driving wheel 31. When the driving wheel 31 rotates, the detouring section S is driven to continuously shift on the transmission belt 50, so as to drive the sliding base 20 to slide on the pedestal 10 along the linear direction X.

As abovementioned, the positioning belt 40 and the transmission belt 50 are two independent belts in the first embodiment, with two ends of both the positioning belt 40 and the transmission belt 50 fixed to the pedestal 10. Thus, in the first embodiment, two different ends of the pedestal 10 comprise a holder 14, respectively. The two ends of both the positioning belt 40 and the transmission belt 50 are fixed to the two holders 14, respectively, such that the positioning belt 40 and the transmission belt 50 extend along the linear direction X. In addition to being two independent belts, the positioning belt 40 and the transmission belt 50 are also allowed to be a single circular belt (not shown), wherein after two ends of the circular belt are fixed to the pedestal 10 (for example, fixed to the two holders 14 as abovementioned), two sides of the circular belt are arranged face-to-face, thereby forming the positioning belt 40 and the transmission belt 50, respectively. In other words, the positioning belt 40 and the transmission belt 50 are allowed to be two independent belts or one integrated belt.

In the first embodiment, the driving unit 30 comprises a servomotor 32. The servomotor 32 is connected to a first transmission member, and the driving wheel 31 comprises a second transmission member. A connection member is transmissibly connected between the first transmission member and the second transmission member. Preferably, the first transmission member is a pulley 321, the second transmission member is another pulley 311 disposed on the driving wheel 31, and the connection member is a driving belt 33, wherein the connection member is transmissibly mounted on the first transmission member and the second transmission member. In other words, the driving belt 33 is transmissibly mounted on the pulley 321 and the pulley 311. Thus, when the servomotor 32 drives the pulley 321 to rotate, the pulley 311 is driven to rotate through the driving belt 33, such that the driving wheel 31 is forced to rotate in response.

Further, the driving unit 30 comprises two resisting rollers disposed on two sides of the detouring section S, respectively, for resisting the transmission belt 50, such that the transmission belt 50 is forced to be attached to the positioning belt 40. As a result, except for the detouring section S, other sections of the transmission belt 50 are maintained in a meshing status by the second gear rack 51 and the first gear rack 41. In addition, in the first embodiment, the positioning belt 40 comprises a support member. The support member is disposed on one side of the positioning belt 40 in opposite to the transmission belt 50, so as to keep the first gear rack 41 meshed with the second gear rack 51 of the transmission belt 50.

Preferably, the support member comprises two back rollers 42, which are disposed on the sliding base 20 and arranged in alignment with the two resisting rollers 34, respectively. The two resisting rollers 34 and the two back rollers 42 simultaneously move with the sliding base 20. The two resisting rollers 34 resist the transmission belt 50 to force the transmission belt 50 to be attached to the positioning belt 40, with the two back rollers 42 providing back supports to the positioning belt 40.

Figure 5:
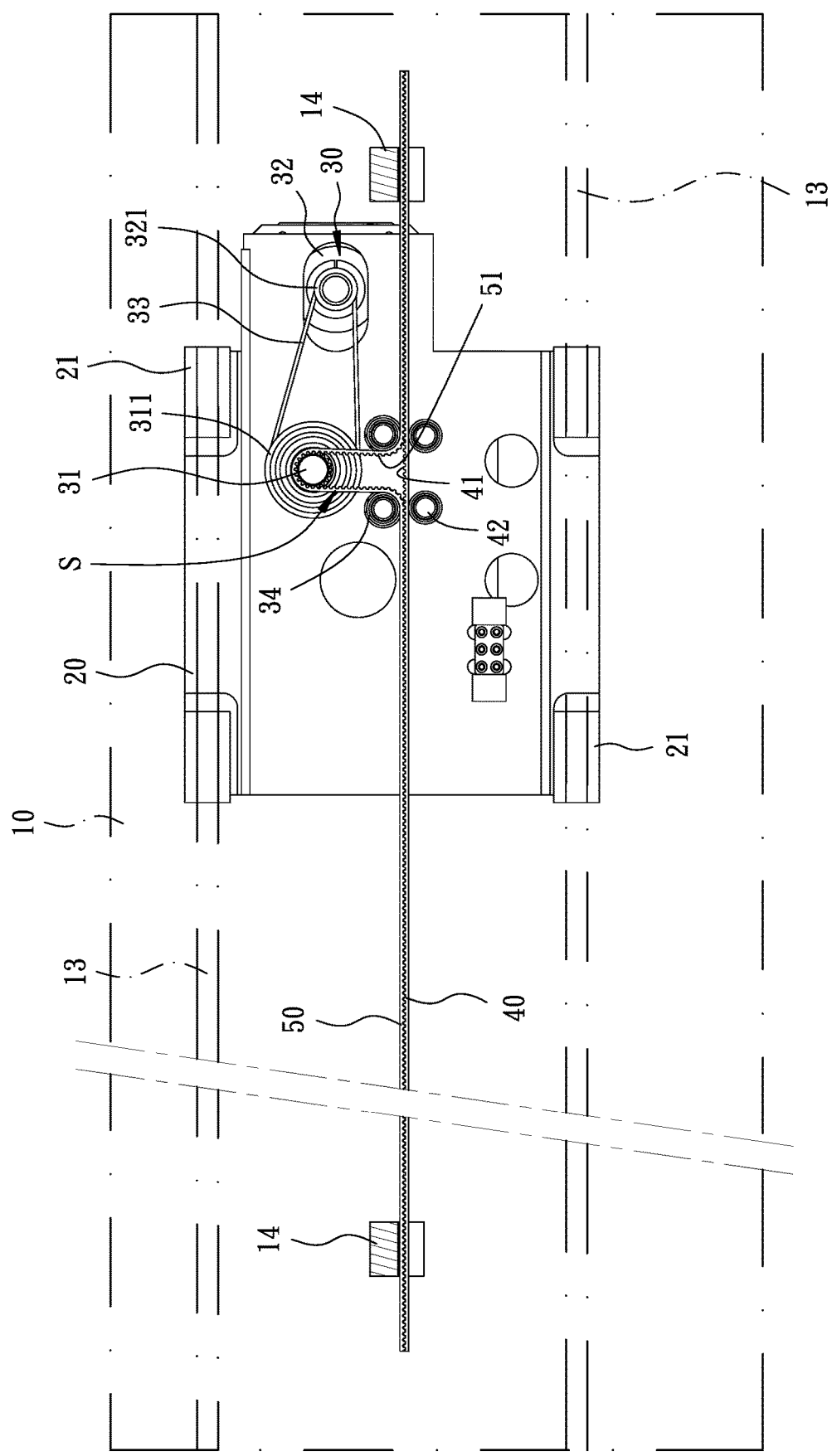
FIG. 5 is a sectional view taken along line 5-5 in FIG. 4, wherein relative positions of the pedestal and a linear rail are shown in imaginary lines.
Figure 6:
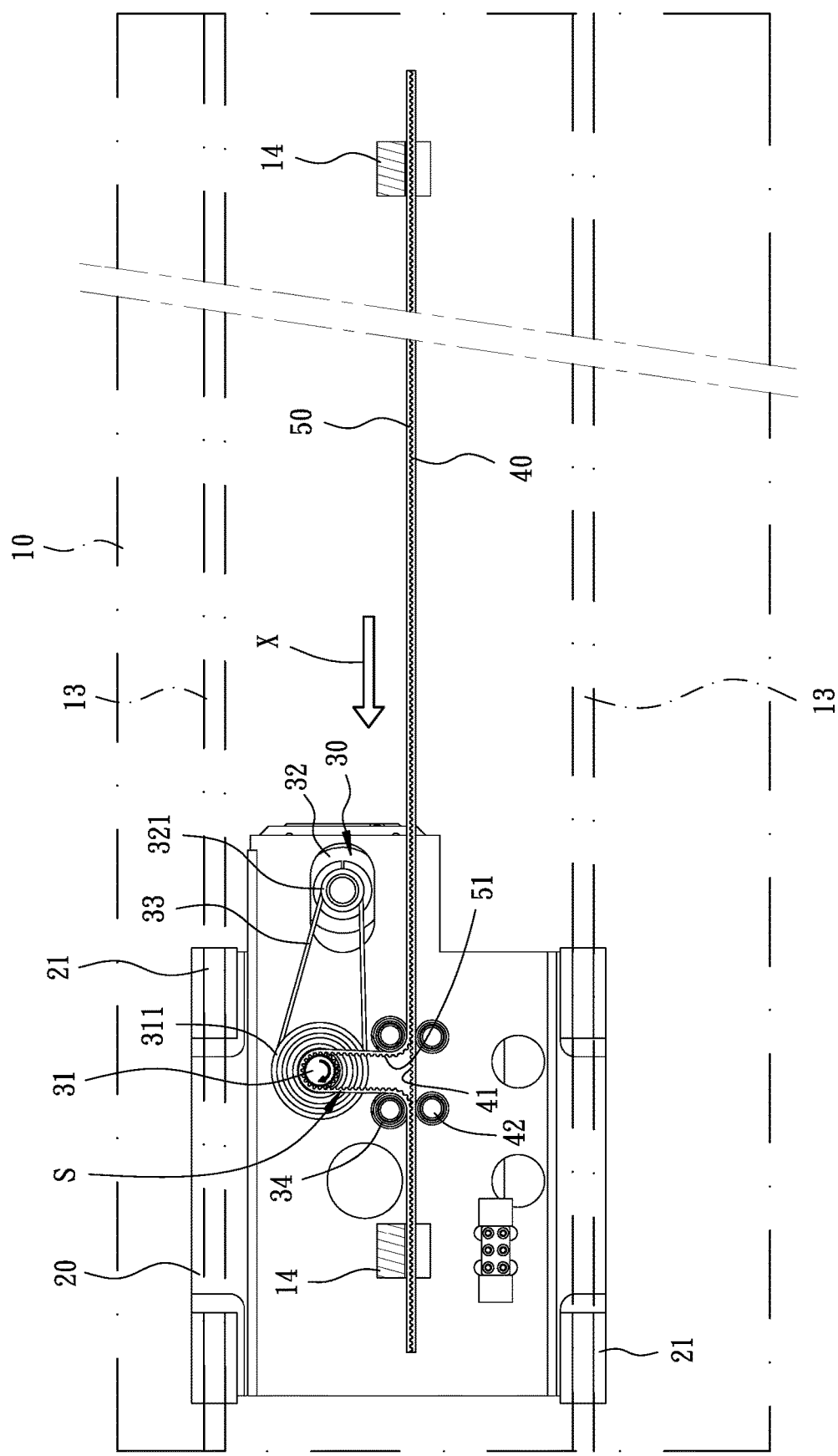
FIG. 6 is a schematic view illustrating the sliding base of FIG. 5 being driven to slide to the left side in the figure by a clockwise rotation of the driving wheel.

In an example operation of the tool changing system with rigidity improved belt moving mechanism in accordance with the embodiment of the present invention, the sliding base 20 is at the right side of FIG. 5. If the sliding base 20 is to be moved toward the left side of FIG. 5, the servomotor 32 drives the driving wheel 31 to rotate clockwise, such that the detouring section S continuously shifts on the transmission belt 50 from the right side to the left side of FIG. 5. As a result, the sliding base 20 is driven to slide toward the left side of FIG. 5, until arriving the left side of FIG. 6 and being positioned thereon. On the other hand, if the servomotor 32 drives the driving wheel 31 to rotate counterclockwise, the detouring section S continuously shifts on the transmission belt 50 from the left side to the right side of FIG. 5, such that the sliding base 20 is driven to slide toward the right side of FIG. 5, until being positioned (not shown).

With the foregoing descriptions, features of the present invention are illustrated as below. The positioning belt 40 and the transmission belt 50 both extend along the linear direction X. When the driving wheel 31 rotates to drive the detouring section S to continuously shift, except for the detouring section S, the other sections of the transmission belt 50 are attached to the positioning belt 40 in the meshing status by the first gear rack 41 and the second gear rack 51. When the transmission belt 50 drives the sliding base 20 to slide along the linear direction X, even though the transmission belt 50 is relatively long due to a long transmission distance demand, the transmission belt 50 is still provided with an optimal rigidity during transmission given that the positioning belt 40 provides restricting and guiding functions by the meshing status of the first gear rack 41 and the second gear rack 51. Thus, the transmission belt 50 stably drives the sliding base 20 to slide along the linear direction X, achieving an advantage of lower cost than the conventional lead threaded rod or gear rack, while remaining the optimal transmission accuracy of the sliding base 20 during transmission.

Figure 7:
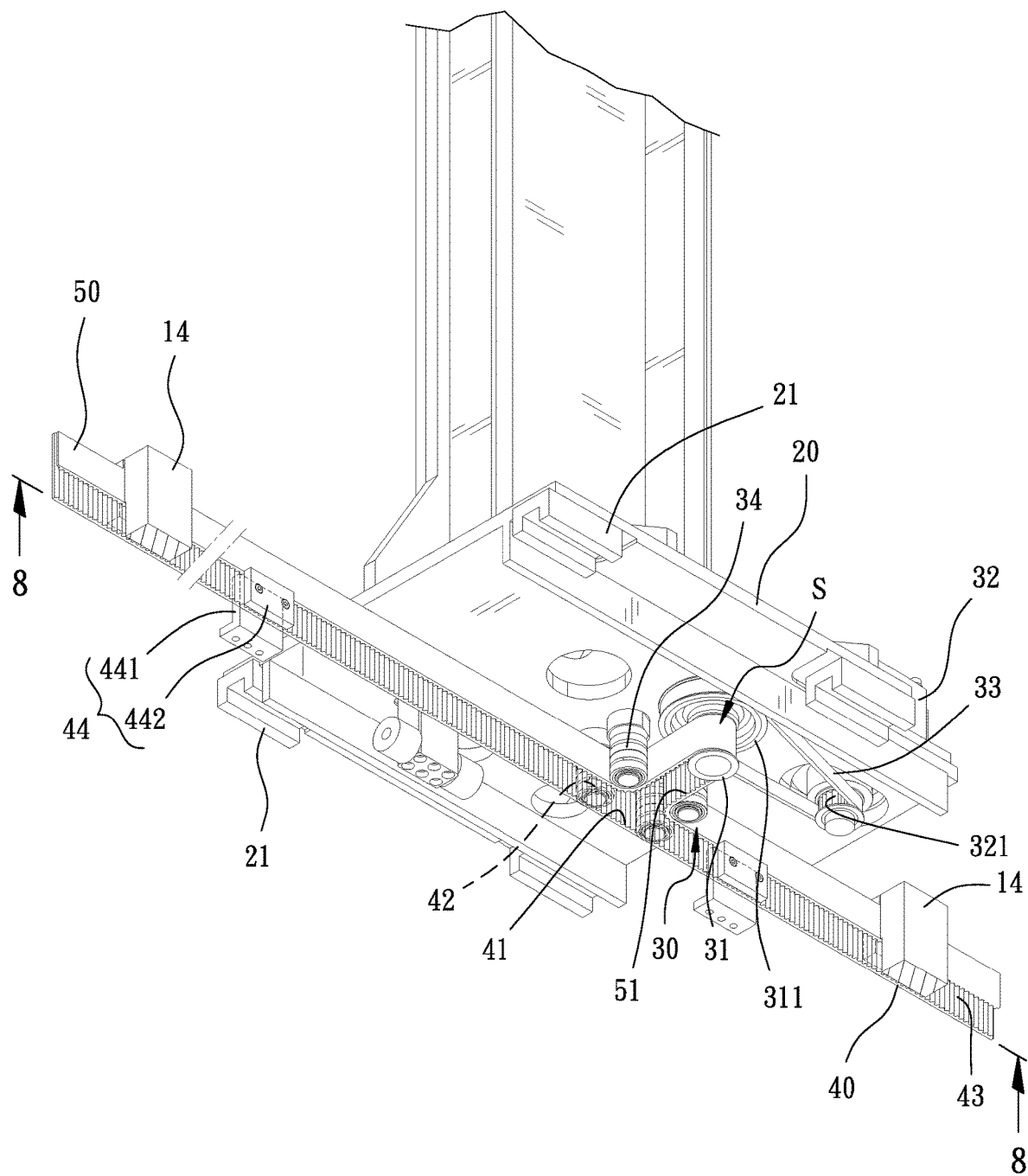
FIG. 7 is a perspective view illustrating the arrangement of the driving unit, the positioning belt, and the transmission belt in accordance with a second embodiment of the present invention, wherein the support member comprises two back rollers and two fixed seats.
Figure 8:
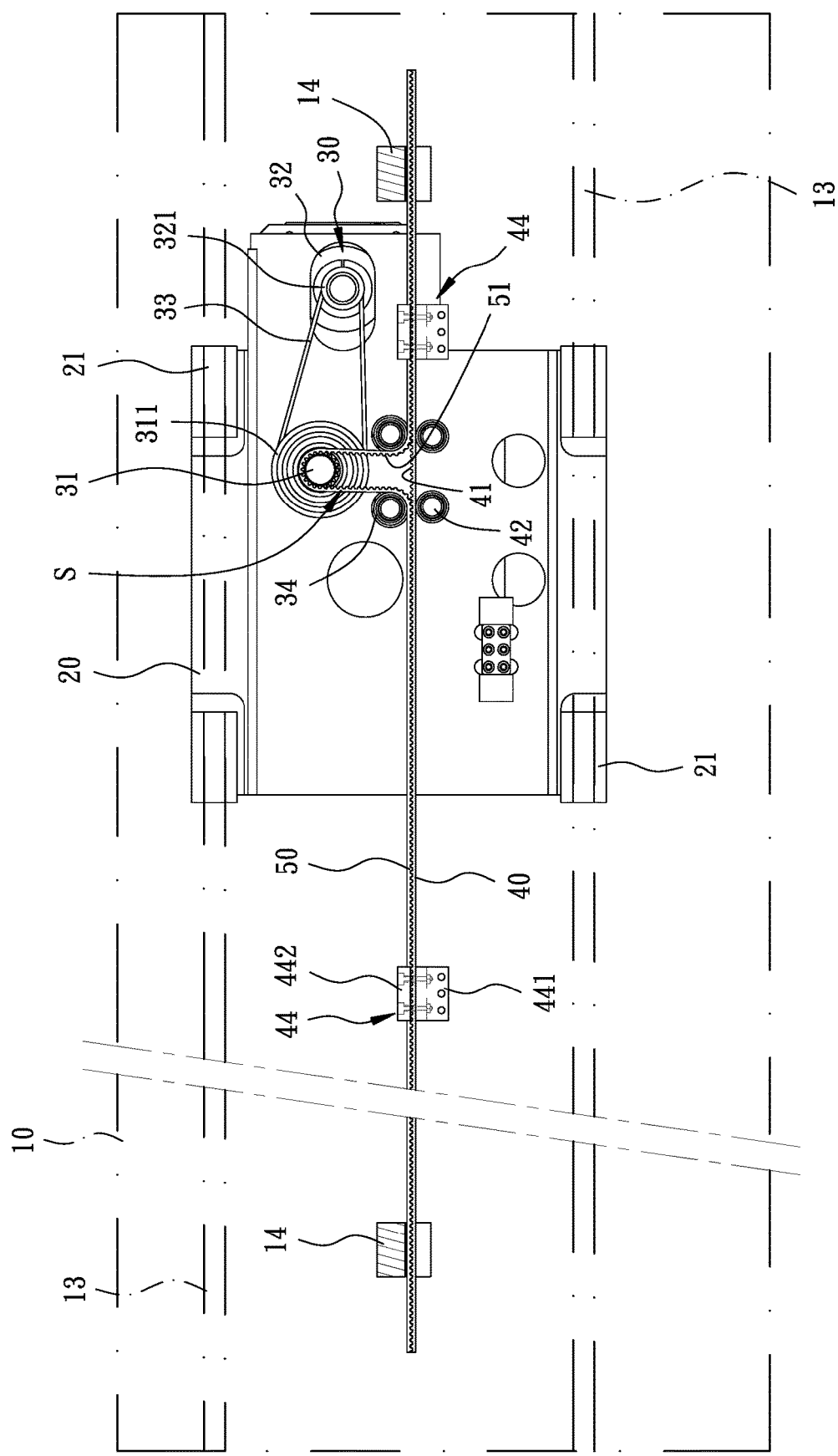
FIG. 8 is a sectional view taken along line 8-8 in FIG. 7, wherein relative positions of the pedestal and the linear rail are shown in imaginary lines.

Referring to FIG. 7 and FIG. 8, a second embodiment of the present invention is provided, in which a major difference compared with the first embodiment is that the width of the positioning belt 40 is larger than the width of the transmission belt 50. As a result, in the meshing status of the first gear rack 41 and the second gear rack 51, the positioning belt 40 comprises a positioning portion 43 extending toward an opposite side of the transmission belt 50. In the second embodiment, the positioning portion 43 extends toward the pedestal 10. In the second embodiment, the support member, in addition to the two back rollers 42, further comprises a fixed seat 44 disposed and fixed on the pedestal 10. The positioning portion 43 is positioned by the fixed seat 44, such that the positioning belt 40 is positioned along the linear direction X.

In detail, the number of the fixed seat 44 is, for example, two in the second embodiment, wherein the two fixed seats 44 are evenly disposed between the two holders 14. Each fixed seat 44 comprises an L-shaped block 441 and a backboard 442, wherein the L-shaped block 441 and the backboard 442 hold two sides of the positioning portion 43, so as to locate the positioning portion 43 along the linear direction X. In addition, the number of the fixed seat 44 is allowed to be one, which is disposed along a length direction of the positioning belt 40, or is allowed to be at least two, which are disposed at intervals, so as to be positioned on the positioning portion 43 for maintaining the positioning belt 40 in a linear form. Besides, in various embodiments, the back roller 42 is allowed to be excluded from the support member, so that only the fixed seat 44 is applied for holding the positioning portion 43 of the positioning belt 40 and providing support for the positioning belt 40, thus maintaining the positioning belt 40 in the linear form.

Figure 9:
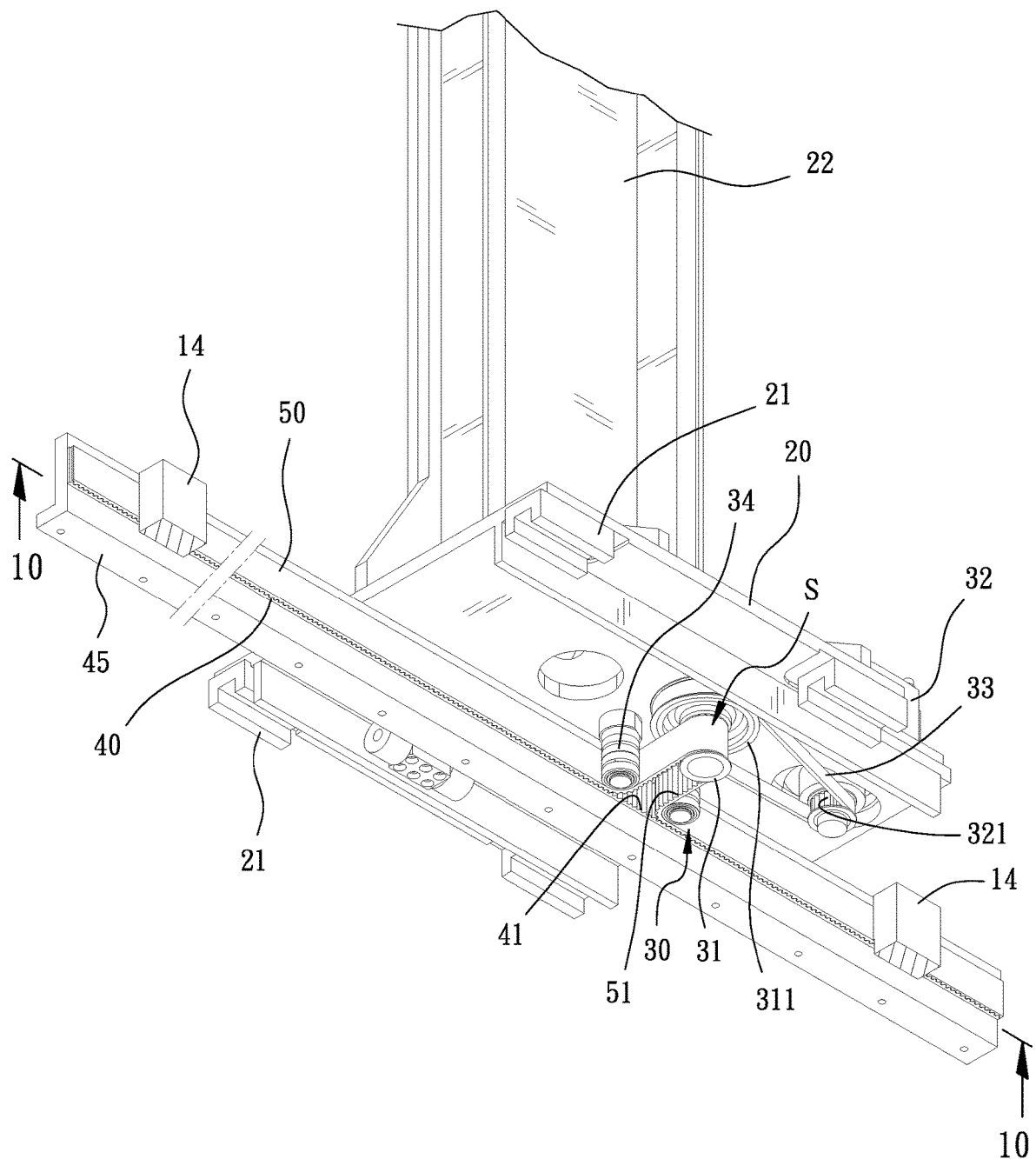
FIG. 9 is a schematic view illustrating an arrangement of the driving unit, the positioning belt, and the transmission belt in accordance with a third embodiment of the present invention, wherein the support member is a fixed backboard.
Figure 10:
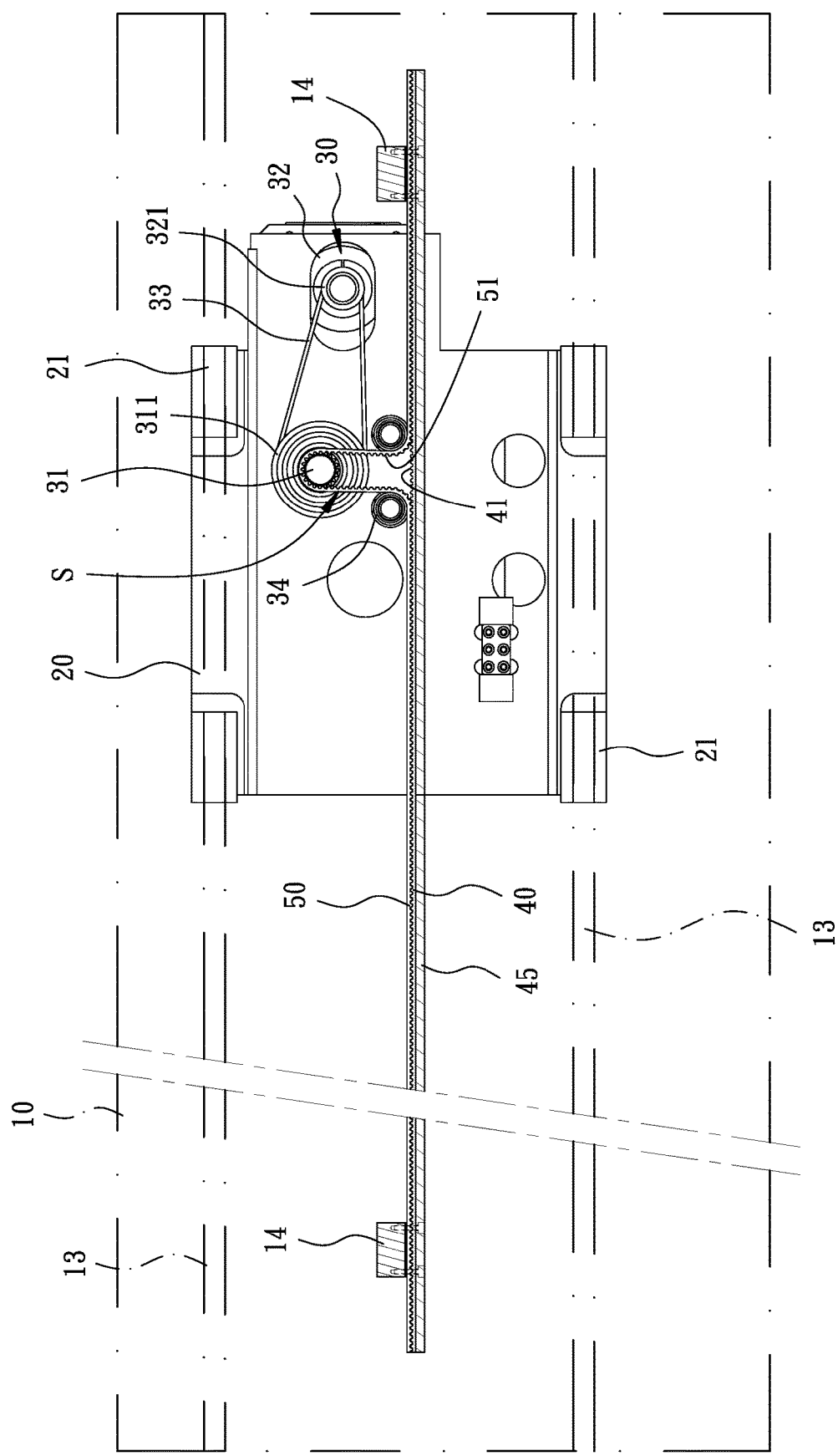
FIG. 10 is a sectional view taken along line 10-10 in FIG. 9, wherein relative positions of the pedestal and the linear rail are shown in imaginary lines.

Referring to FIG. 9 and FIG. 10, a third embodiment of the present invention is provided, in which a major difference compared with the first embodiment and the second embodiment is that the support member is a fixed backboard 45. In the third embodiment, the fixed backboard 45 is formed in an L-shape, and fixed to the pedestal 10 (not shown). The fixed backboard 45 is disposed along a length of the positioning belt 40, and the positioning belt 40 is attached and fixed to the fixed backboard 45 (for example, through bolt or adhesive), thus achieving the objective of maintaining the positioning belt 40 in the linear form.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tool changing system with rigidity improved belt moving mechanism with improved rigidity, comprising,
   a pedestal comprising a tool rest on which a plurality of tools are positioned, the pedestal also comprising a pair of linear rails;
   a sliding base having a bottom face thereof slidably disposed on the two linear rails through two sliding blocks and reciprocating on the pedestal along a linear direction; the sliding base comprising an erecting frame, on which a tool changing device is disposed, the tool changing device vertically moving on the erecting frame for picking and placing a tool at a position of the corresponding tool rest; the sliding base comprising a support member, the support member comprising a plurality of back rollers;
   a driving unit disposed on the pedestal, the driving unit comprising a driving wheel which is driven to rotate, and a plurality of resisting rollers;
   a positioning belt with two ends thereof being fixed on the pedestal between the two linear rails and extending along the linear direction, the positioning belt comprising a first gear rack vertically disposed between the two ends of the positioning belt and facing one of the linear rails; and
   a transmission belt attached to the positioning belt, two ends of the transmission belt being fixed on the pedestal and arranged between the two linear rails and attached to and extending with the positioning belt, the transmission belt comprising a second gear rack vertically disposed between the two ends of the transmission belt and facing the other linear rail, so that the transmission belt is meshed with the first gear rack through the second gear rack, and comprising a detouring section which is separated from the positioning belt and transmissibly meshed with the driving wheel; the driving wheel rotating to drive the detouring section to continuously shift on the transmission belt, and simultaneously driving the sliding base to slide along the linear direction on the pedestal; wherein
   the plurality of the resisting roller are disposed on two sides of the detouring section, respectively, for resisting the transmission belt, such that the transmission belt is forced to be attached to the positioning belt; the plurality of back rollers are disposed on one side of the positioning belt in opposite to the transmission belt; the plurality of back rollers are arranged in alignment with the plurality of resisting rollers, respectively; the resisting rollers and the back rollers simultaneously move with the sliding base; the resisting rollers resist the transmission belt to force the transmission belt to be attached to the positioning belt, with the back rollers providing a back support to the positioning belt, such that the transmission belt, except for the detouring section, is maintained in a meshing status with the positioning belt by the second gear rack and the first gear rack.

2. The tool changing system with rigidity improved belt moving mechanism of claim 1, wherein a width of the positioning belt is larger than a width of the transmission belt; in the meshing status of the first gear rack and the second gear rack, the positioning belt comprises a positioning portion extending away from the transmission belt; the support member comprises a fixed seat disposed and fixed on the pedestal; the positioning portion is positioned by the fixed seat, such that the positioning belt is positioned along the linear direction.

3. The tool changing system with rigidity improved belt moving mechanism of claim 2, wherein the fixed seat comprises an L-shaped block and a backboard; the L-shaped block and the backboard hold two sides of the positioning portion, so as to locate the positioning portion.

4. The tool changing system with rigidity improved belt moving mechanism of claim 1, wherein the driving unit comprises a servomotor connected to a first transmission member, and the driving wheel comprises a second transmission member; a connection member is transmissibly connected between the first transmission member and the second transmission member.

5. The tool changing system with rigidity improved belt moving mechanism of claim 4, wherein both the first transmission member and the second transmission member are pulleys, and the connection member is a driving belt transmissibly mounted on the first transmission member and the second transmission member.

6. The tool changing system with rigidity improved belt moving mechanism of claim 1, wherein the pedestal comprises a holder at two different ends of the pedestal, respectively; two ends of the positioning belt and two ends of the transmission belt are fixed by the holders, such that the positioning belt and the transmission belt extend along the linear direction.

7. The tool changing system with rigidity improved belt moving mechanism of claim 6, wherein the positioning belt and the transmission belt are two independent belts, with two ends of the positioning belt and two ends of the transmission belt fixed to the holders, respectively.

8. The tool changing system with rigidity improved belt moving mechanism of claim 6, wherein the positioning belt and the transmission belt are formed of a single circular belt, with two ends of the circular belt fixed to the pedestal.

* * * * *